(12) United States Patent
Kito

(10) Patent No.: US 9,142,556 B2
(45) Date of Patent: Sep. 22, 2015

(54) DUMMY GATE CELL, CELL-BASED IC, AND PORTABLE DEVICE

(71) Applicant: Yoshiharu Kito, Kyoto (JP)

(72) Inventor: Yoshiharu Kito, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 42 days.

(21) Appl. No.: 13/848,857

(22) Filed: Mar. 22, 2013

(65) Prior Publication Data

US 2013/0249014 A1    Sep. 26, 2013

(30) Foreign Application Priority Data

Mar. 23, 2012   (JP) .................................. 201266850

(51) Int. Cl.
*H01L 21/70* (2006.01)
*H01L 27/092* (2006.01)
*G06F 17/50* (2006.01)
*H01L 27/02* (2006.01)

(52) U.S. Cl.
CPC .......... *H01L 27/092* (2013.01); *G06F 17/5068* (2013.01); *G06F 17/5081* (2013.01); *H01L 27/0207* (2013.01); *G06F 2217/12* (2013.01)

(58) Field of Classification Search
CPC .... H01L 21/70; H01L 27/092; H01L 27/0207
See application file for complete search history.

(56) References Cited

U.S. PATENT DOCUMENTS

| | | | |
|---|---|---|---|
| 6,335,640 B1 * | 1/2002 | Okamoto | 326/101 |
| 6,493,275 B2 * | 12/2002 | Tomita | 365/189.09 |
| 7,589,566 B2 * | 9/2009 | Ohbayashi et al. | 326/101 |
| 8,456,856 B2 * | 6/2013 | Lin et al. | 361/783 |
| 2004/0140483 A1 * | 7/2004 | Yonemaru | 257/204 |
| 2006/0097324 A1 * | 5/2006 | Arai et al. | 257/357 |
| 2011/0102019 A1 * | 5/2011 | Osada et al. | 326/102 |

FOREIGN PATENT DOCUMENTS

| | | |
|---|---|---|
| JP | 6-061440 | 3/1994 |
| JP | 6-177361 | 6/1994 |
| JP | 2000-332206 | 11/2000 |

* cited by examiner

*Primary Examiner* — Hai L Nguyen
(74) *Attorney, Agent, or Firm* — Fish & Richardson P.C.

(57) ABSTRACT

A dummy gate cell includes an nMOS transistor and a pMOS transistor, wherein a drain electrode of the nMOS transistor is not connected to a drain electrode of the pMOS transistor and the dummy gate cell is disposed in an unused area not occupied by a basic cell in a cell-based IC.

5 Claims, 18 Drawing Sheets

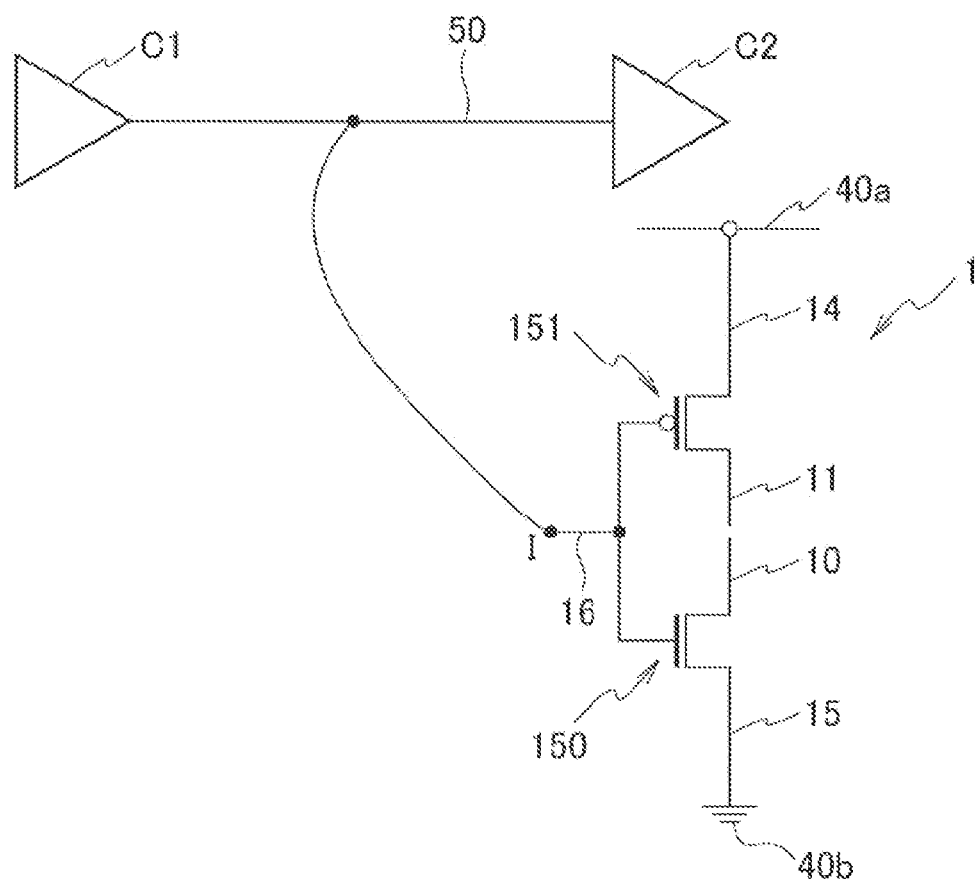

ated circuit (LSI) designed and manufactured by com-
DUMMY GATE CELL, CELL-BASED IC, AND PORTABLE DEVICE

CROSS-REFERENCE TO RELATED APPLICATION(S)

This application is based upon and claims the benefit of priority from Japanese Patent Application No. 2012-66850, filed on Mar. 23, 2012, the entire contents of which are incorporated herein by reference.

TECHNICAL FIELD

The present disclosure relates to a dummy gate cell, a cell-based integrated circuit (IC), and a layout system and a layout method of a cell-based IC. More particularly, the present disclosure relates to a dummy gate cell, a cell-based IC, and a layout system and a layout method of a cell-based IC capable of reducing power and ground noise while restraining power consumption.

BACKGROUND

A cell-based integrated circuit (IC) is a type of an application specific integrated circuit (ASIC).

That is, the cell-based IC is a semi-custom large-scale integrated circuit (LSI) designed and manufactured by combining various logical cells prepared in advance as a library.

The cell-based IC is, for example, configured as an IC by mixing large-scale circuit blocks (mega cells or macro cells) and basic standard cells (basic circuits).

The cell-based IC realized by the standard cells may include random logics.

Conventionally, a cell-based semi-custom designing method has been widely used in designing an ASIC.

In this designing method, common intellectual properties (IP) registered to a library are combined and an automatic layout wiring tool is used, thus promoting the enhancement of efficiency in IC designing.

As ICs are advancing toward the reduction in size, charges are accumulated in a wiring pattern due to an etching process, or the like of an IC, and the charges flow to a device through a gate electrode to generate a so-called antenna effect of degrading the characteristics of the device.

Various techniques for preventing the antenna effect have been proposed.

In the related art, the solutions to the general antenna effect include restraining a length of a wiring directly connected to a gate electrode to restraining an antenna ratio and increasing an area of an antenna diode to increase a maximum ratio.

Here, the antenna ratio refers to a ratio of an area of a signal wiring (metal wiring) connected to a gate electrode to an area of the gate electrode (a gate area) in a CMOS transistor. Further, the antenna diode is used to release accumulated charges.

However, the countermeasures to restrain the length of a wiring directly connected to the gate electrode in order to restrain the antenna ratio and increase the area of the antenna diode in order to increase the maximum ratio, and the like, in a situation in which a gate area is reduced as ICs are increasingly reduced in size, have problems in that wiring convenience are lowered and usage efficiency of an area is degraded.

SUMMARY

The present disclosure provides some embodiments of a dummy gate cell, a cell-based IC, and a layout system and a layout method of a cell-based IC capable of suppressing an antenna effect, while reducing a loss of wiring convenience and area usage efficiency.

According to one embodiment of the present disclosure, provided is a dummy gate cell, including: an nMOS transistor; and a pMOS transistor, wherein the nMOS transistor and the pMOS transistor, a drain electrode of the nMOS transistor is not connected to a drain electrode of the pMOS transistor, and the dummy gate cell is disposed in an unused area not occupied by a basic cell in a cell-based IC.

According to another embodiment of the present disclosure, provided is a cell-based integrated circuit (IC), including: a semiconductor substrate; a plurality of basic cells formed on the semiconductor substrate to have a plurality of semiconductor devices and internal wirings, and having a predetermined function provided by connecting the semiconductor devices using the internal wirings; a wiring region formed on the semiconductor substrate and having an external wiring to connect the basic cells; a power source wiring configured to supply power to the semiconductor devices, and a ground wiring; and a dummy gate cell formed on the semiconductor substrate and having an nMOS transistor and a pMOS transistor, wherein a drain electrode of the nMOS transistor is not connected to a drain electrode of the pMOS transistor, the dummy gate cell is disposed in an unused area not occupied by the basic cells and a gate electrode of the dummy gate cell is connected to the external wiring.

BRIEF DESCRIPTION OF THE DRAWINGS

FIG. 6 is an explanatory view illustrating a state in which the dummy gate cell is connected to a wiring between basic cells.

DETAILED DESCRIPTION

Figure 1:
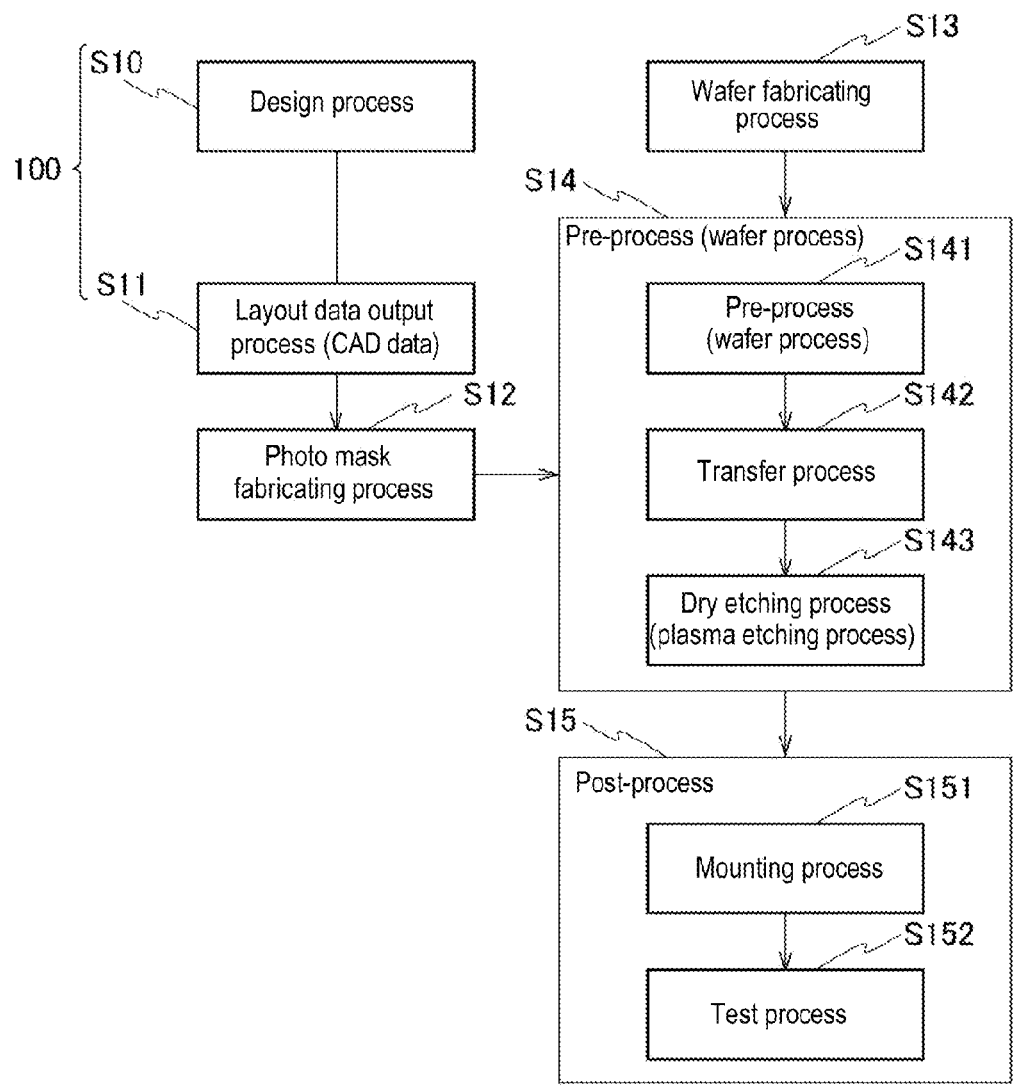
FIG. 1 is a flowchart illustrating a designing and fabricating method of a cell-based IC.

Hereinafter, embodiments of the present disclosure will be described with reference to the drawings. In the following description of the drawings, like or similar reference numerals are used for like or similar parts. However, it should be noted that the drawings are schematic and relationships between thickness and planar dimensions, thickness ratios of respective layers, and the like are different from those of the reality. Therefore, specific thicknesses and dimensions should be determined in consideration of the following descriptions. Also, it is understood that parts having mutually different dimension relationships and ratios are included in mutual drawings.

Further, the following embodiments illustrate an apparatus or a method for embodying a technical concept of the present disclosure, and in the embodiments of the present disclosure, the materials, features, configurations, arrangements, and the like of constituent components are not limited to those mentioned hereinafter. The embodiments of the present disclosure may be variously modified within the scope of the claims.

Embodiments

Cell-Based IC Layout System

A cell-based IC layout system 100 according to an embodiment of the present disclosure will be described with reference to FIGS. 1 and 2.

First, before describing the cell-based IC layout system 100, the entire process of designing and fabricating the cell-based IC will be briefly described with reference to FIG. 1.

Here, the cell-based IC refers to an IC in which desired circuit functional blocks are configured by arbitrarily combining a plurality of types of basic cells in which predetermined semiconductor elements are formed in advance.

As illustrated in FIG. 1, the process for designing and fabricating the cell-based IC includes a designing process (step S10) performed by using the cell-based IC layout system 100, a process (step S11) of outputting layout data (CAD (Computer Aided Design) data), a process (step S12) of fabricating a photo mask based on the output layout data, a wafer fabricating process (step S13) of fabricating a wafer as a semiconductor substrate, a pre-process (a wafer process) (step S14) of fabricating semiconductor devices in the wafer, and a post-process (step S15) of assembling the semiconductor devices into a final product.

The pre-process may include a film forming process (step S141) of forming an oxide film, or the like on the wafer, a process (step S142) of transferring a layout pattern by using the photo mask, a dry etching process (step S143) of fabricating a device structure corresponding to the layout pattern through plasma etching, and the like.

Further, the post-process may include a mounting process (step S151) of performing dicing of the wafer with the semiconductor devices formed thereon, die-bonding, a lead bonding, encapsulating with a resin, and the like, a test process (step S152) of inspecting a completed cell-based IC, and the like.

As described above, the cell-based IC layout system 100 according to the present embodiment performs the designing process of step S10 and the process of outputting the layout data of step S11.

An antenna effect to be resolved by the cell-based IC layout system 100 according to the present embodiment is generated in the plasma etching process in step S143.

That is, when plasma processing is performed on the silicon substrate (wafer) by using plasma, charges are accumulated in a gate oxide film (a gate insulating layer) or an adjacent layer included in a MOS transistor, and a so-called antenna effect, that may cause plasma damage such as charge-up, is generated.

When the MOS transistor is plasma-damaged, a shift deviation of a threshold voltage (Vth) or a decrease of a current driving capability is occurred to degrade the semiconductor devices.

Next, a configuration of the cell-based IC layout system 100 according to an embodiment of the present disclosure will be described with reference to the functional block of FIG. 2.

The cell-based IC layout system 100 is a layout system for designing a cell-based IC layout by using an information processing device 200 configured as a computer such as a personal computer, or a workstation.

Specifically, the cell-based IC layout system 100 in the course of layout designing includes an antenna ratio calculating unit 201 for calculating an antenna ratio based on a wiring pattern and a gate area, an error wiring extracting unit 202 for extracting an error wiring based on the antenna ratio calculated by the antenna ratio calculating unit 201, an unused area extracting unit 203 for extracting an unused area not occupied by a basic cell in the course of layout designing, a dummy gate cell disposing unit 204 for inserting a dummy gate cell having an nMOS transistor and a pMOS transistor, in which a drain electrode of the nMOS transistor is not connected to a drain electrode of the pMOS transistor, into the error wiring extracted by the error wiring extracting unit 202 and disposing the dummy gate cell in the unused area extracted by the unused area extracting unit 203, and a wire connecting unit 205 for connecting the dummy gate cell disposed by the dummy gate cell disposing unit 204 to a power wiring and a ground wiring by a wire.

Further, each of the units may be realized as software executable by the information processing device 200.

In addition, the cell-based IC layout system 100 includes an input device 300 configured as a pointing device such as a key board or a mouse for inputting various setting values, indications, and the like, and a display device 400 configured as a liquid crystal display monitor, or the like.

The cell-based IC layout system 100 further includes a layout data output unit 500 for outputting layout data (CAD data) to an external photo mask fabricating device 600 after the layout designing is completed.

Also, the layout system 100 of the cell-based IC further includes an antenna diode connection unit 206 for connecting a cathode electrode of an antenna diode to a gate electrode of the dummy gate cell, and connecting an anode electrode of the antenna diode to a ground wiring.

<Dummy Gate Cell>

Now, a dummy gate cell 1 will be described with reference to FIGS. 3 to 6.

Figure 3:
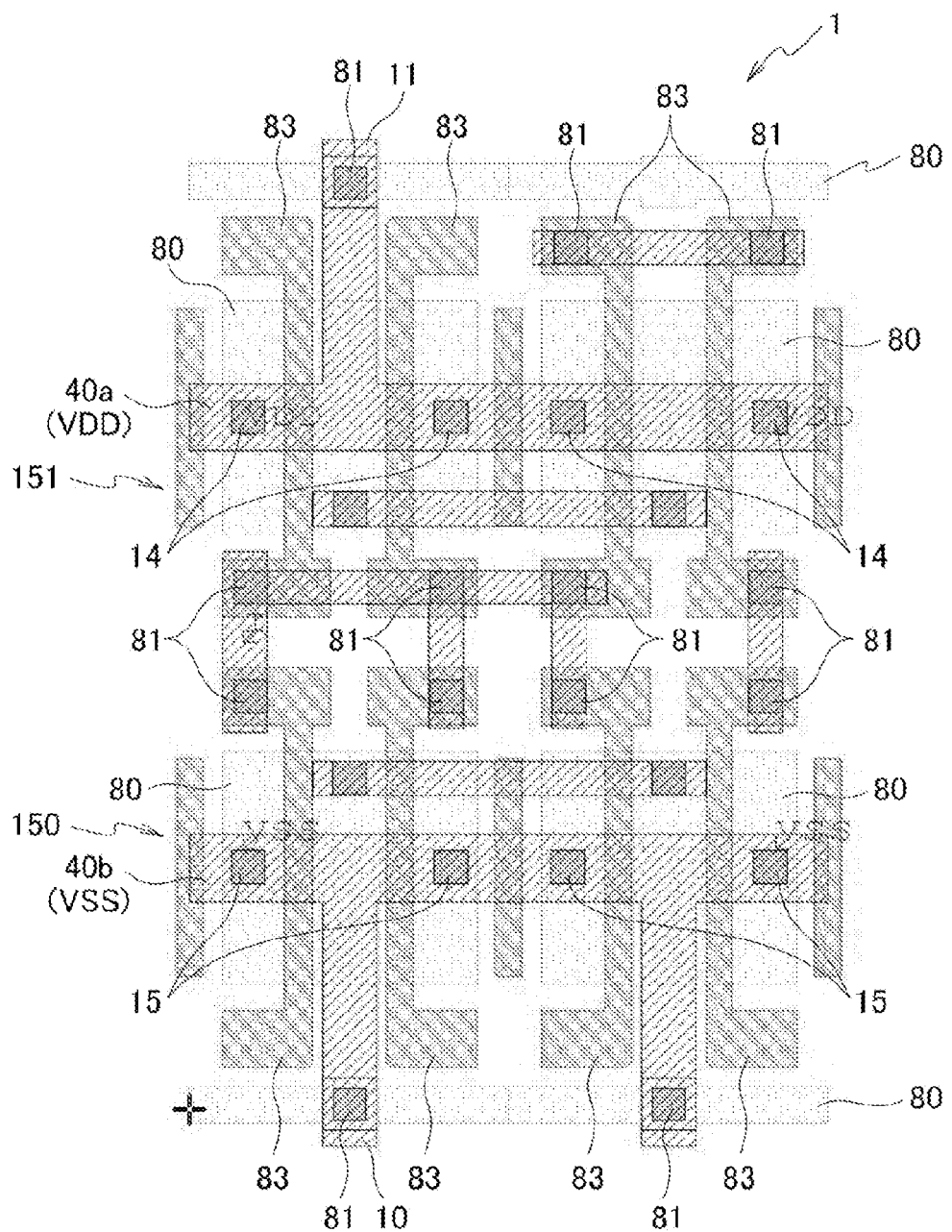
FIG. 3 is a plan view illustrating a configuration example of a dummy gate cell.
Figure 4:
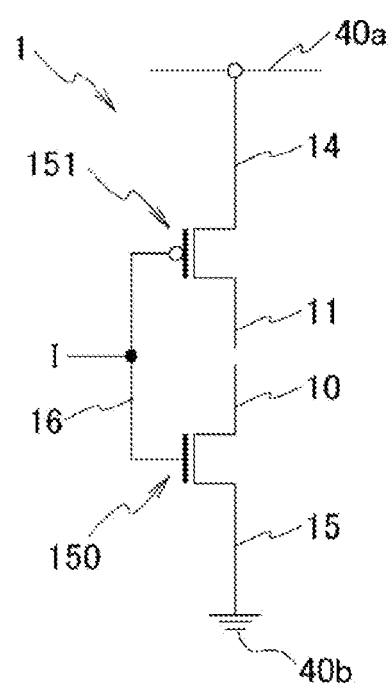
FIG. 4 is a circuit diagram illustrating the dummy gate cell.

As illustrated in FIGS. 3 and 4, the dummy gate cell 1 as a gate array applied to the present embodiment includes an nMOS transistor 150 and a pMOS transistor 151. The nMOS transistor 150 and the pMOS transistor 151. A drain electrode 10 of the nMOS transistor 150 and a drain electrode 11 of the pMOS transistor 151 are not connected to each other.

Source electrodes 14 of the pMOS transistor 151 constituting the dummy gate cell 1 are connected to a power source wiring 40a (VDD), and source electrodes 15 of the nMOS transistor 150 are connected to a ground wiring 40b (VSS).

Further, in FIG. 3, reference numeral 80 denotes an active region configured as a diffusion layer, reference numeral 81 denotes a contact, and reference numeral 83 denotes a polysilicon gate.

Figure 5A:
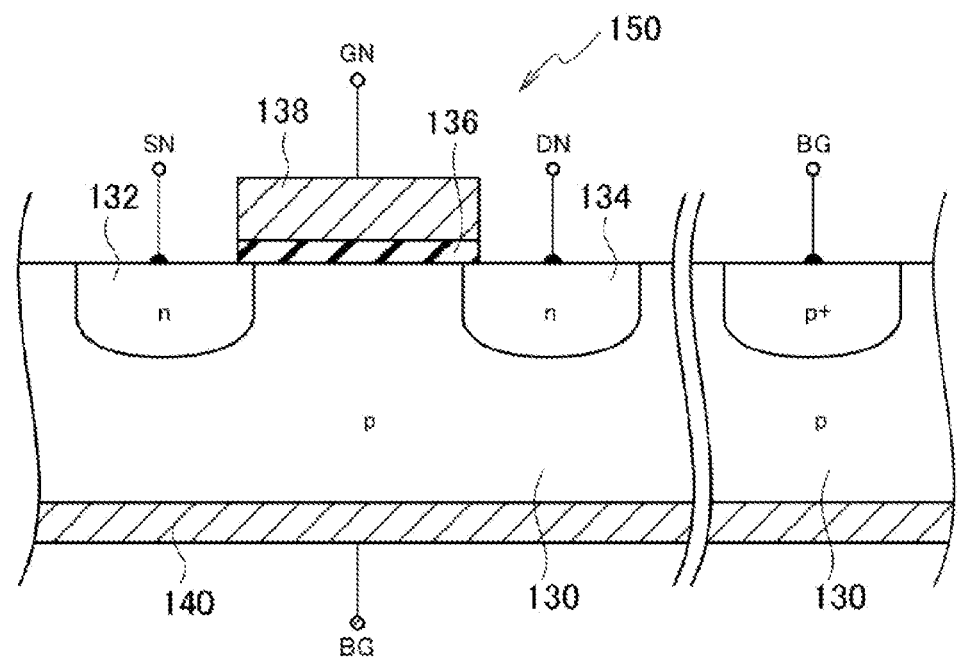
FIG. 5A is a schematic cross-sectional view illustrating the structure of an n channel MOSFET constituting the dummy gate cell.

As illustrated in FIG. 5A, the nMOS transistor 150 constituting the dummy gate cell 1 includes a source region 132 and a drain region 134 disposed on a p-type semiconductor layer 130, a gate insulating layer 136 disposed on the p-type semiconductor layer 130, a gate electrode 138 disposed on the gate insulating layer 136, and a back gate electrode 140 disposed on a rear surface of the p-type semiconductor layer 130. A source wiring SN, a drain wiring DN, a gate wiring GN, and a back gate wiring BG are connected to the source region 132, the drain region 134, the gate electrode 138, and the back gate electrode 140, respectively.

Figure 5B:
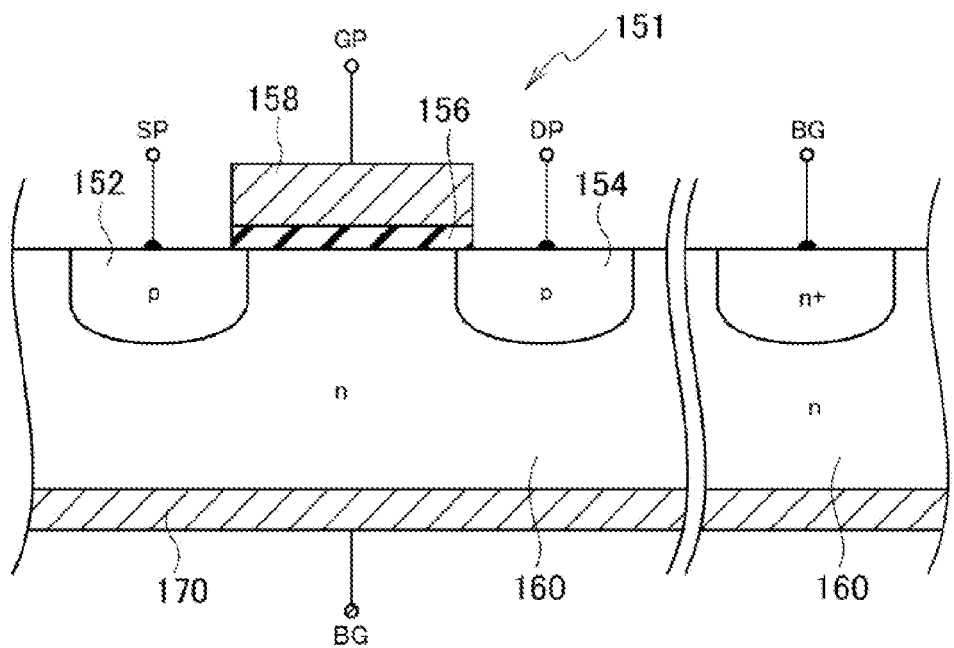
FIG. 5B is a schematic cross-sectional view illustrating the structure of a p channel MOSFET constituting the dummy gate cell.

Also, as illustrated in FIG. 5B, the pMOS transistor 151 constituting the dummy gate cell 1 includes a source region 152 and a drain region 154 disposed on an n-type semiconductor layer 160, a gate insulating layer 156 disposed on the n-type semiconductor layer 160, a gate electrode 158 disposed on the gate insulating layer 156, and a back gate electrode 170 disposed on a rear surface of the n-type semiconductor layer 160. A source wiring SP, a drain wiring DP, a gate wiring GP, and a back gate wiring BG are connected to the source region 152, the drain region 154, the gate electrode 158, and the back gate electrode 170, respectively.

As illustrated in FIG. 6, a gate electrode 16 of the dummy gate cell 1 is connected to a wiring 50 for connecting basic cells C1 and C2.

That is, in order to suppress an antenna effect of the basic cell C2, the dummy gate cell 1 is connected to the wiring 50 for connecting the basic cells C1 and C2. Meanwhile, the wiring 50 may be an error wiring extracted by the error wiring extracting unit 202 of the cell-based IC layout system 100.

As illustrated in FIG. 6, the drain electrode 10 and the drain electrode 11 are not connected to each other so that a DC current does not flow, reducing power consumption.

In addition, since charges between the basic cells C1 and C2 are accumulated in the nMOS transistor 150 and the pMOS transistor 151 constituting the dummy gate cell 1, an antenna effect can be suppressed. Thus, charge-up can be suppressed even when plasma etching is performed, preventing a degradation of the device.

Comparative Example

Conventionally, an antenna effect is avoided by restraining an antenna ratio to below a maximum ratio by a wiring pattern connected to a gate electrode. Specifically, the antenna ratio is controlled to satisfy the condition of Eq. (1) shown below:

$$\text{antenna ratio}(A.R) < \text{maximum ratio}(M.R), \quad \text{Eq. (1)}$$

where antenna ratio=(area of a wiring)/(gate area), maximum ratio=(diode area×α+β), and α and β are parameters determined based on manufacturing conditions.

Further, as for a general antenna effect countermeasure in the related art, in order to restrain an antenna ratio, a length of a wiring directly connected to a gate electrode is restrained, and a diode area of an antenna diode is increased in order to increase a maximum ratio.

However, as a size of a cell-based IC is increasingly reduced, a gate area is reduced, so the countermeasure of restraining a length of a wiring directly connected to a gate electrode to restrain an antenna ratio and increasing an area of an antenna diode to increase a maximum ratio obviously runs counter to wiring convenience and area usage efficiency of the cell-based IC.

Figure 7:
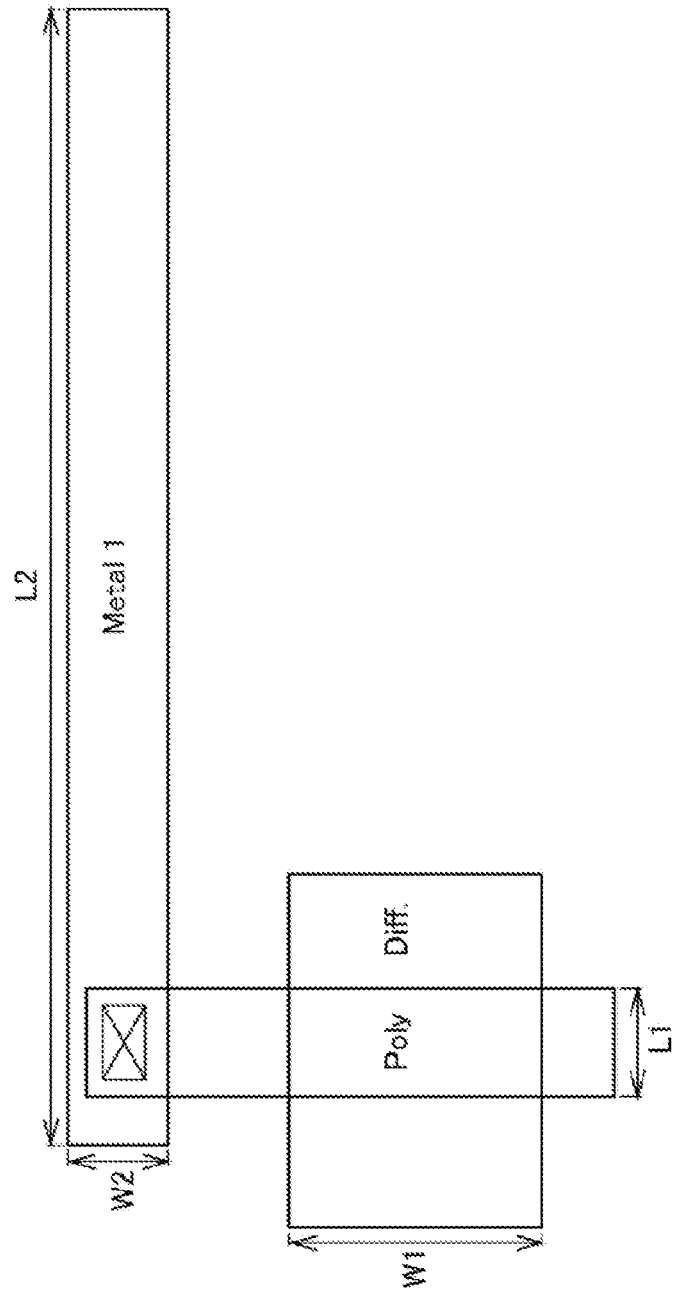
FIG. 7 is an explanatory view illustrating an example of an antenna rule.
Figure 8:
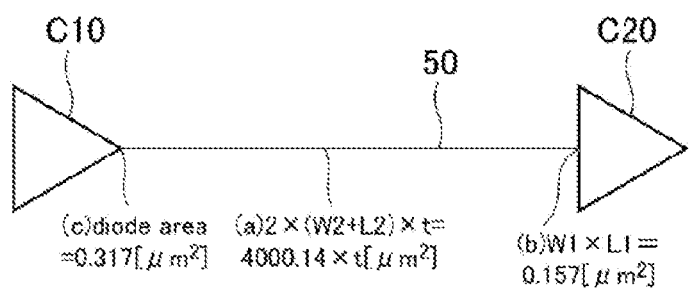
FIG. 8 is an explanatory view illustrating cells and a wiring according to a comparative example.

Specifically, for example, in case of a predetermined antenna rule (design rule) as illustrated in FIG. 7, patterns of the cells C10 and C11 and the wiring 50 illustrated in FIG. 8 may be determined as follows:

(a) Regarding the wiring 50, 2×(W2+L2)×t=4000.14×t [μm$^2$], (b) Regarding the cell C20, W1×L1=0.157 [μm$^2$], and (c) Regarding the cell C10, diode area=0.317 [μm$^2$].

In the case of the foregoing patterns, since an antenna ratio=(a)/(b)=4000.14/0.157=25478.59873, a maximum allowable ratio=(c)×400+2200=0.371×400+2200=2348.4, and antenna ratio>maximum allowable ratio, the wiring 50 is determined to be an antenna error wiring.

In the related art, the antenna effect is corrected by a diode of a buffer output in the above (c).

In this case, in order to obtain antenna ratio<maximum allowable ratio, 25478.59873<(c)×400+2200

(c)>(25478.59873−2200)/400

(c)>58.196, so a diode equivalent to the buffer output of (c) requires 184 (=58.196/0.371) cells.

Thus, the related art has a problem in that since, for example, 184 antenna diodes are required, a layout area of the antenna diodes is increased.

Meanwhile, in case of the method for correcting an antenna effect by connecting the dummy gate cell 1 to the buffer input of the above (b) according to the present disclosure, in order to make antenna ratio<maximum allowable ratio, 4000.14/(b)<2348.4

(b)>1.7, so 11 (=1.7/0.157) dummy gate cells 1 equivalent to the gate area of the buffer input of (b) are required.

Thus, according to the present disclosure, the amount of required cells can be reduced by about 94%, relative to the comparative example, and therefore, area usage efficiency can be enhanced and power consumption can also be significantly reduced.

<Extraction of Unused Area and Insertion of Dummy Gate Cell>

Extraction of an unused area not occupied by a basic cell and insertion of a dummy gate cell in the cell-based IC 101 in the course of layout designing will be described with reference to FIGS. 9 to 11.

A cell-based IC is a user-demanded IC implemented by a combination of required cells selected from a standardized cell library used in common in various ICs.

The library includes, for example, small logical circuits such as a NAND, and a NOR, large logical circuits such as a memory and an ALU, or analog circuits such as an analog-to-digital converter (ADC), and a comparator.

Figure 9:
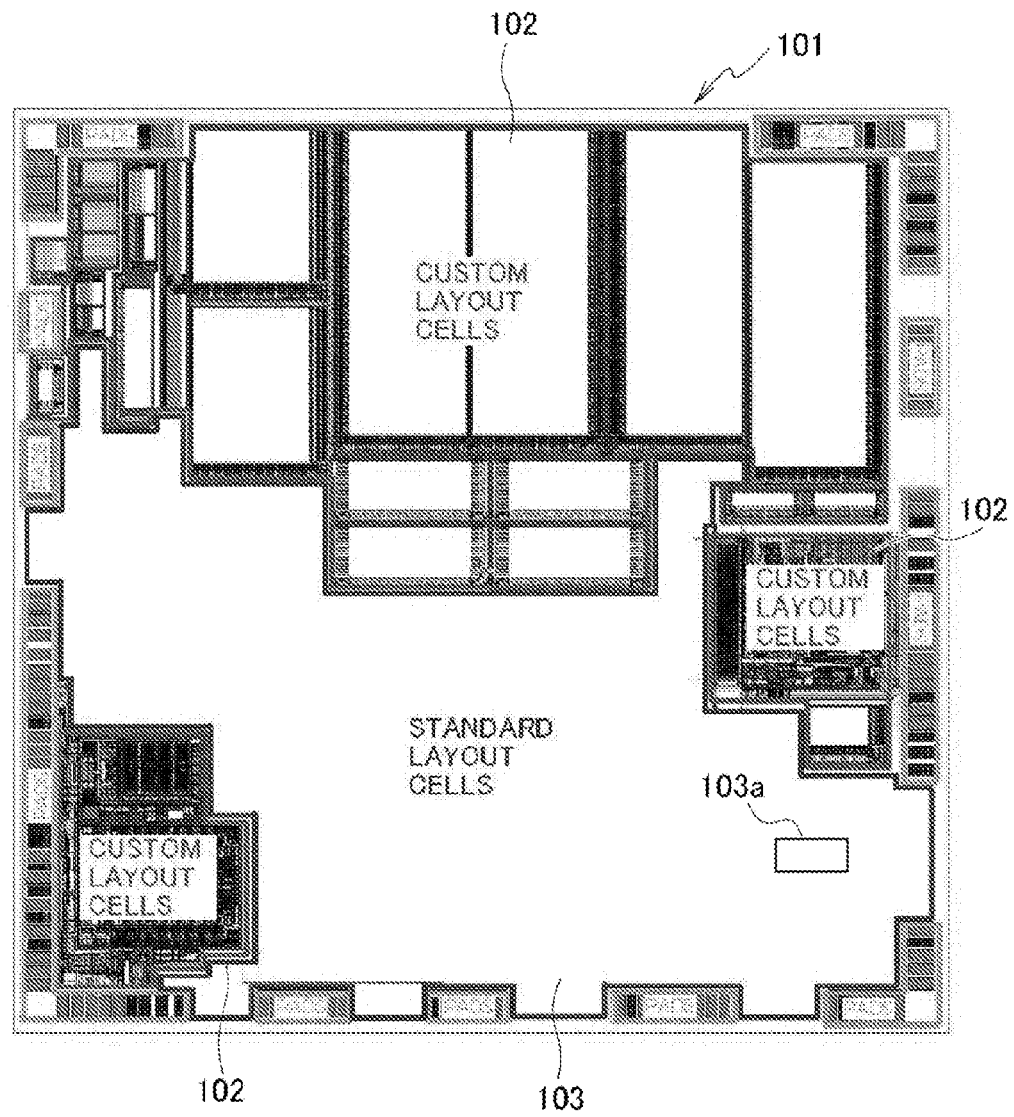
FIG. 9 is a plan view illustrating a configuration example of a cell-based IC under layout design.

In the cell-based IC 101 according to the present embodiment, as illustrated in FIG. 9, custom layout cells 102, which are designed independently to meet a user demand, and basic cells (standard layout cells) 103 formed by implementing a minimum function constituting a logical circuit as cells are combined to form functional blocks.

The basic cells 103 are configured as a collection of gate cells constituting circuits such as an inverter, a NAND, a NOR, a flip-flop circuit, a composite circuit, a gate, and a buffer.

Figure 10:
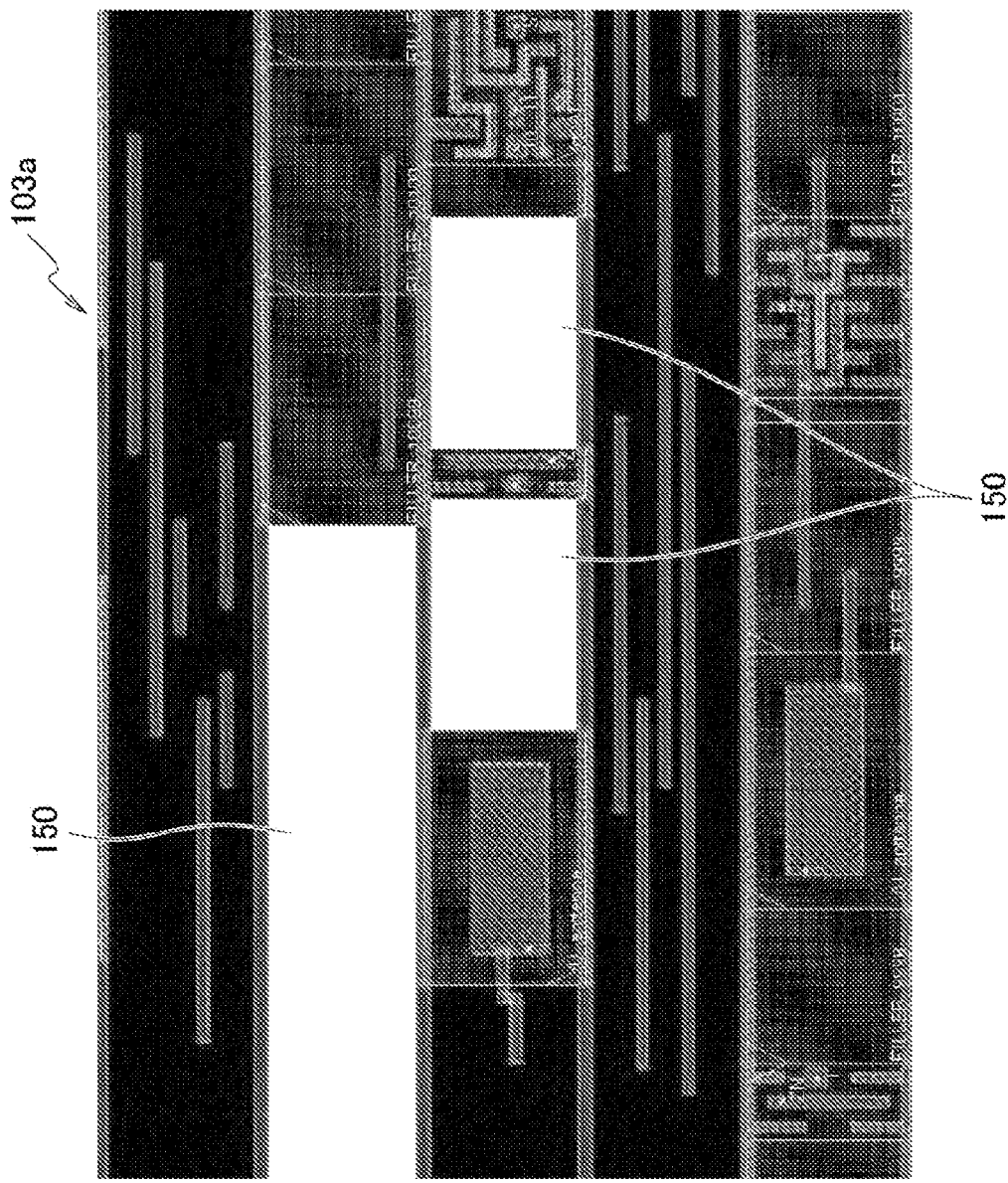
FIG. 10 is an enlarged view of a portion of a basic cell including an unused area.

FIG. 10 is an enlarged view of a partial region 103a of the basic cell 103 of the cell-based IC 101 in the course of layout designing by the cell-based IC layout system 100.

Unused areas 150 as illustrated in FIG. 10 are extracted through calculation by the unused area extracting unit 203 of the cell-based IC layout system 100.

Figure 11:
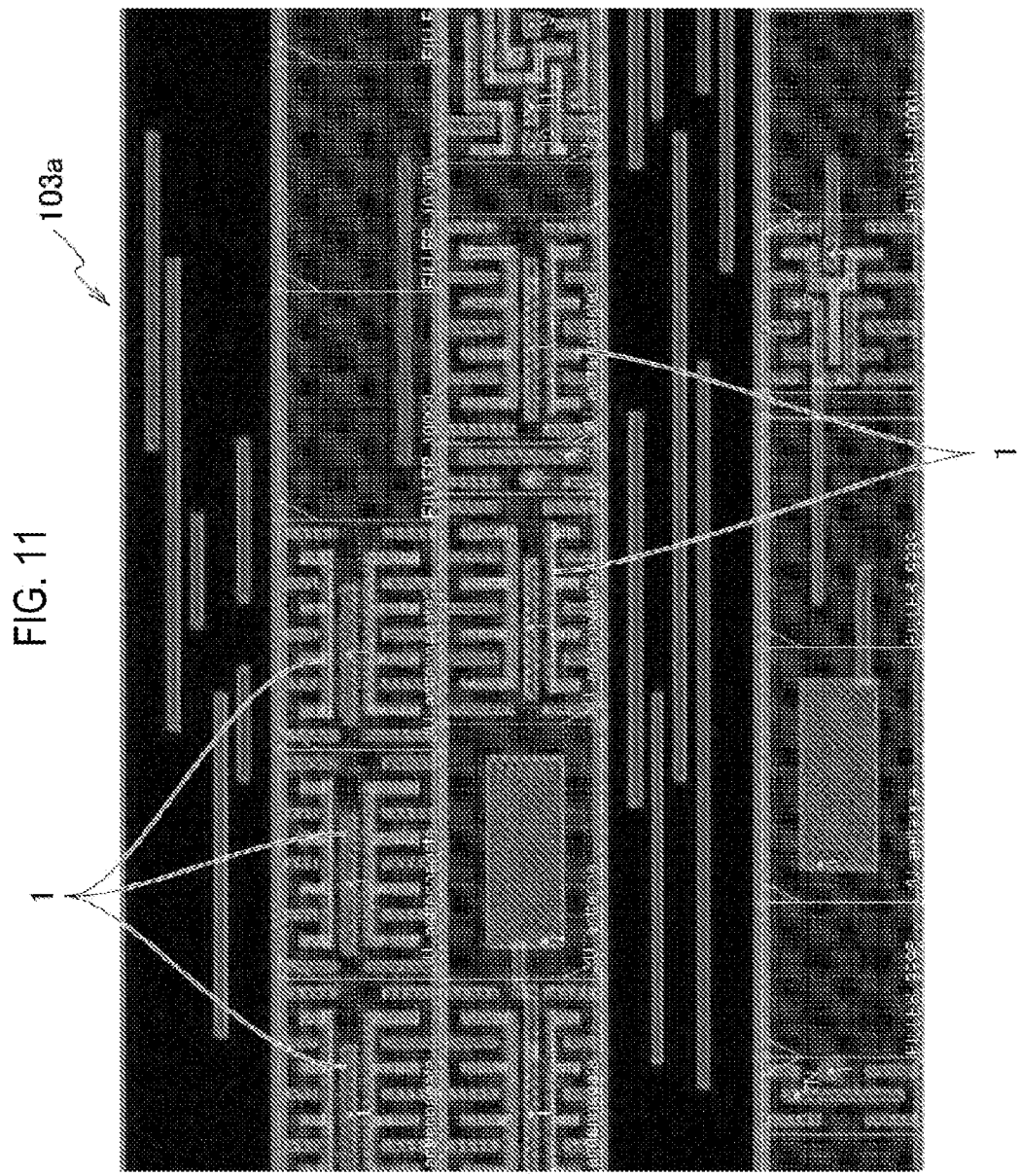
FIG. 11 is an enlarged view illustrating a state in which the dummy gate cell is inserted into the unused area.

Next, the dummy gate cells 1 are disposed in the unused areas 150 by the dummy gate cell disposing unit 204 (see FIG. 11).

Also, in the process of extracting the unused areas 150 and the process of disposing the dummy gate cells 1, an operator may manipulate the input device 300 to instruct the cell-based IC layout system 100 to perform the processes, or the layout system 100 may automatically perform the processes according to a preset program.

<Disposing of Dummy Gate Cell>

Figure 12:
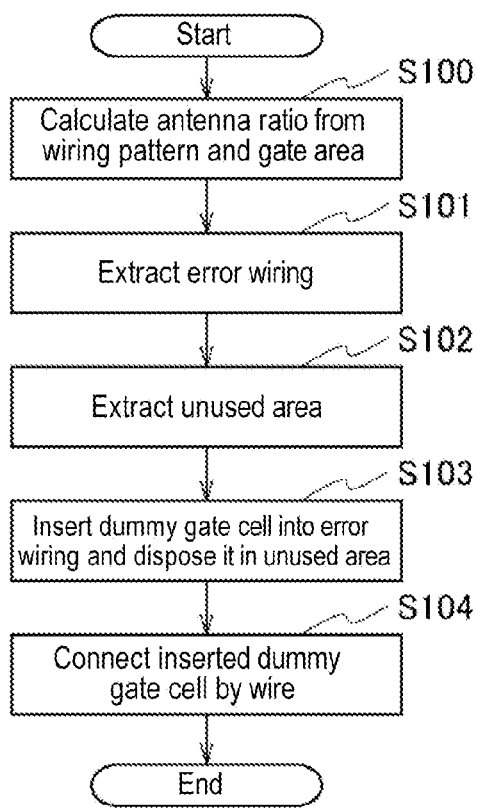
FIG. 12 is a flowchart illustrating a processing sequence of disposing the dummy gate cell executed by the cell-based IC layout system.

A processing sequence of disposing a dummy gate cell executed by the cell-based IC layout system 100 will be described with reference to the flowchart of FIG. 12.

When the process starts, first, an antenna ratio is calculated from a wiring pattern and a gate area in step S100, and the process proceeds to step S101.

In step S101, an error wiring is extracted based on a predetermined antenna rule, and the process proceeds to step S102.

In step S102, an unused area 150 in the cell-based IC 101 in the course of layout designing is extracted, and the process proceeds to step S103.

In step S103, the dummy gate cell 1 is inserted into the error wiring, which is, then disposed in the unused area 150, and the process proceeds to step S104.

In step S104, the inserted dummy gate cell 1 is wire-connected, and the process is terminated.

Accordingly, an antenna effect can be suppressed, while reducing a loss of wiring convenience and area usage efficiency.

(Modifications of Dummy Gate Cell)

Figure 13:
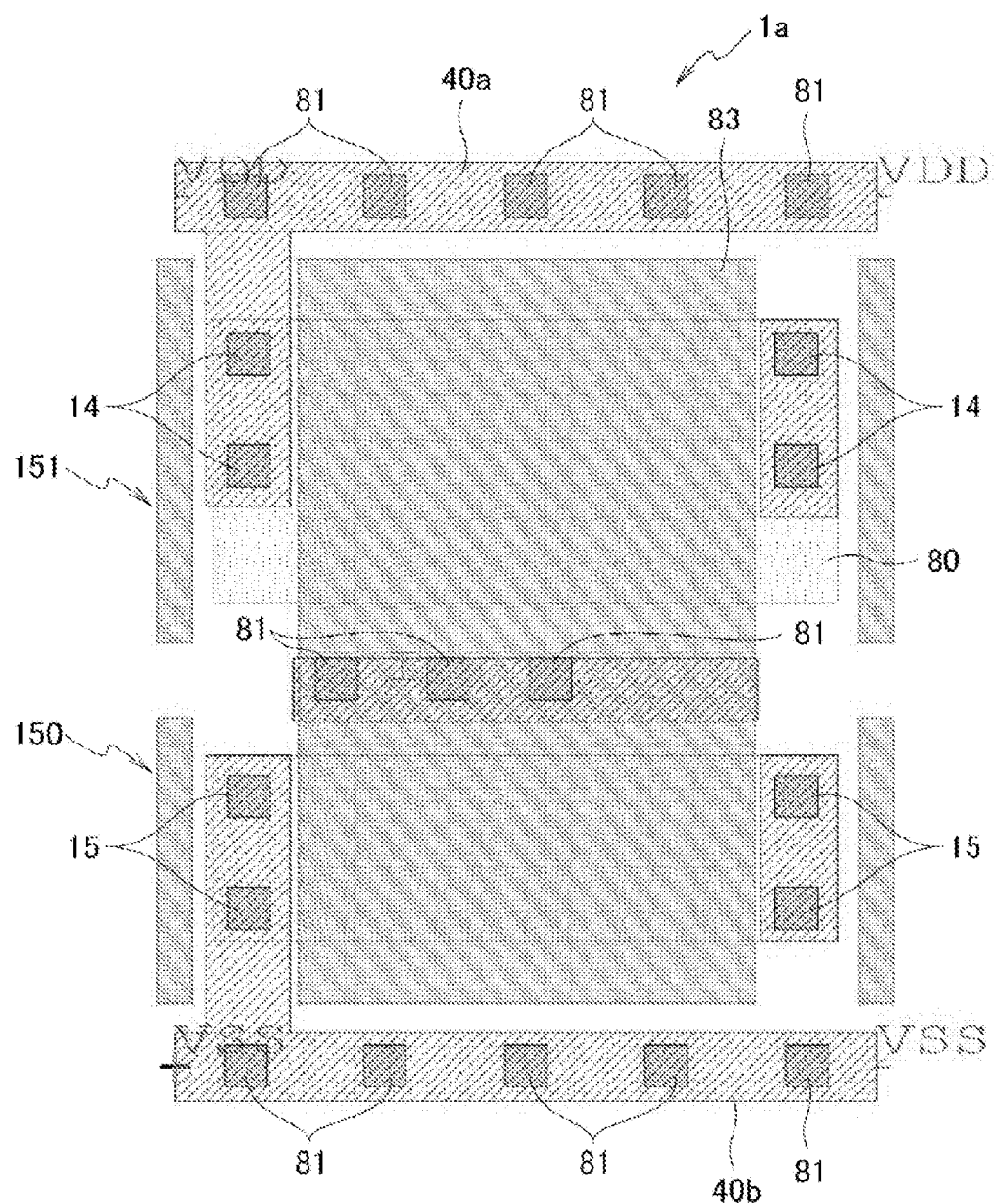
FIG. 13 is a plan view illustrating a modification example of the dummy gate cell.

A dummy gate cell 1a illustrated in FIG. 13 is configured as a standard cell, rather than as a gate array.

The configuration of the dummy gate cell 1a is the same as that of the dummy gate cell 1 configured as the gate array illustrated in FIG. 3, and therefore, the same reference numerals are used and a detailed description thereof will be omitted.

Figure 14:
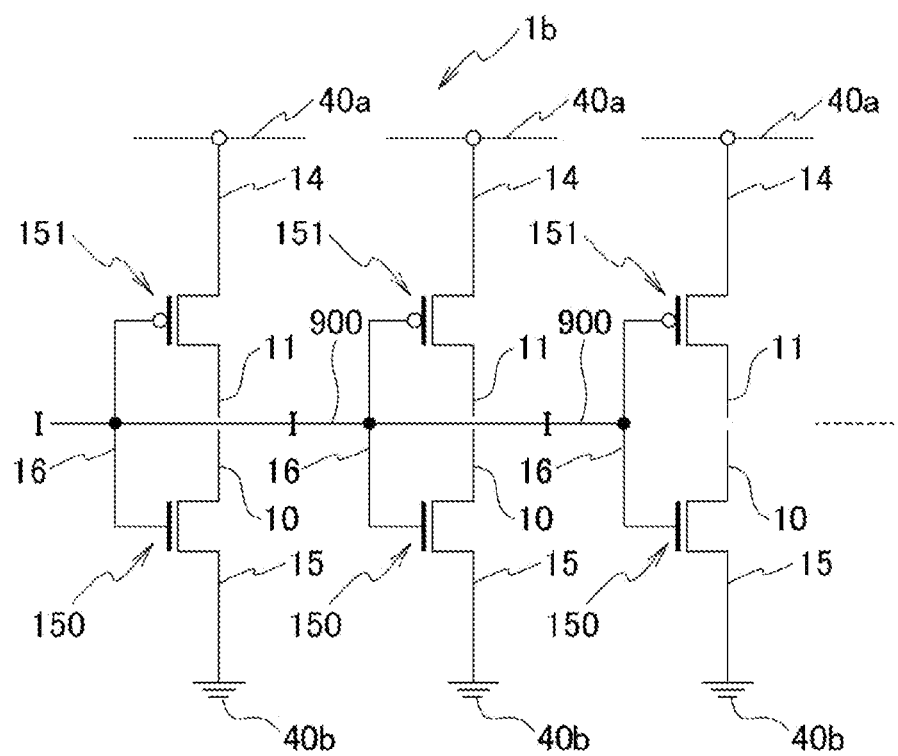
FIG. 14 is a circuit diagram illustrating a modification example of the dummy gate cell.

In a dummy gate cell 1b illustrated in FIG. 14, a plurality of (three in FIG. 14) dummy gate cells are disposed such that gate electrodes 16 are connected through wirings 900.

Accordingly, a larger amount of charges can be released, efficiently suppressing an antenna effect.

Figure 15:
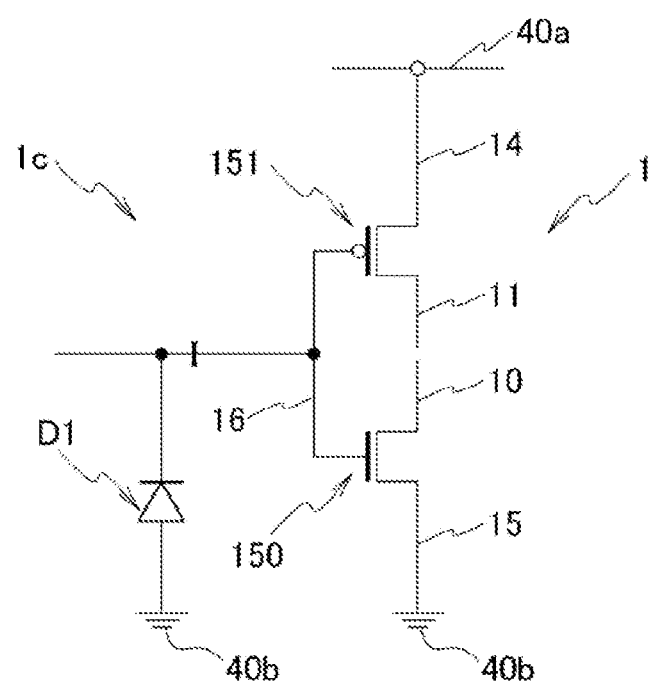
FIG. 15 is a circuit diagram illustrating another modification example of the dummy gate cell.

In a dummy gate cell 1c illustrated in FIG. 15, a cathode electrode of an antenna diode D1 is connected to the gate electrode 16 of the dummy gate cell 1 illustrated in FIG. 4, and an anode electrode of the antenna diode D1 is connected to a ground wiring 40b.

Accordingly, an effect of the antenna diode D1 is added to release a larger amount of charges, efficiently suppressing an antenna effect.

Figure 16:
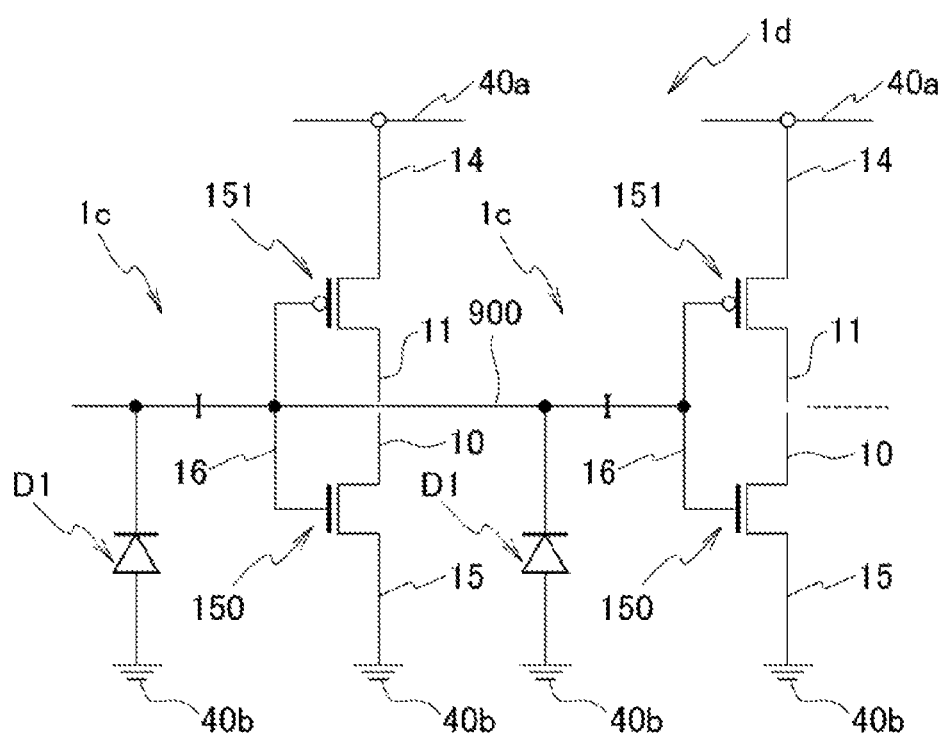
FIG. 16 is a circuit diagram illustrating another modification example of the dummy gate cell.

A dummy gate cell 1d illustrated in FIG. 16 is configured by connecting a plurality of (two in FIG. 16) dummy gate cells 1c as illustrated in FIG. 15.

Accordingly, an effect of the antenna diode D1 is added to release a larger amount of charges, more efficiently suppressing an antenna effect.

Figure 17:
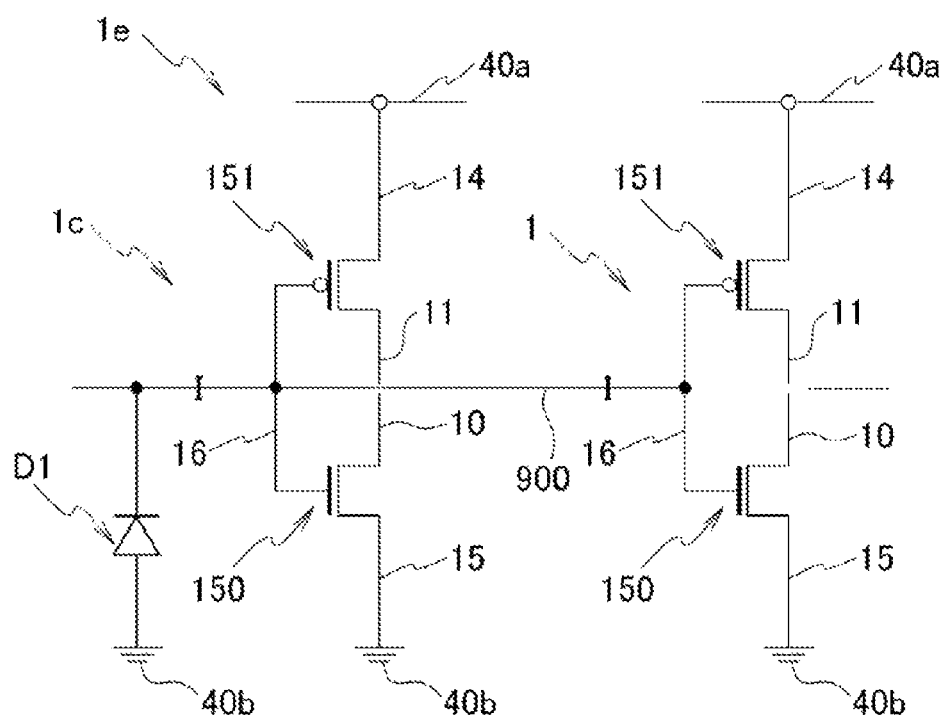
FIG. 17 is a circuit diagram illustrating another modification example of the dummy gate cell.

A dummy gate cell 1e illustrated in FIG. 17 is configured by connecting the dummy gate cell 1 illustrated in FIG. 4 and the dummy gate cell 1c illustrated in FIG. 15.

Accordingly, an effect of the antenna diode D1 is added to release a larger amount of charges, more efficiently suppressing an antenna effect.

<Cell-Based IC>

The cell-based IC 101 layout-designed by the cell-based IC layout system 100 as described above will be described with reference to FIGS. 1 to 3, 6, and 9 to 11 described above.

Figure 2:
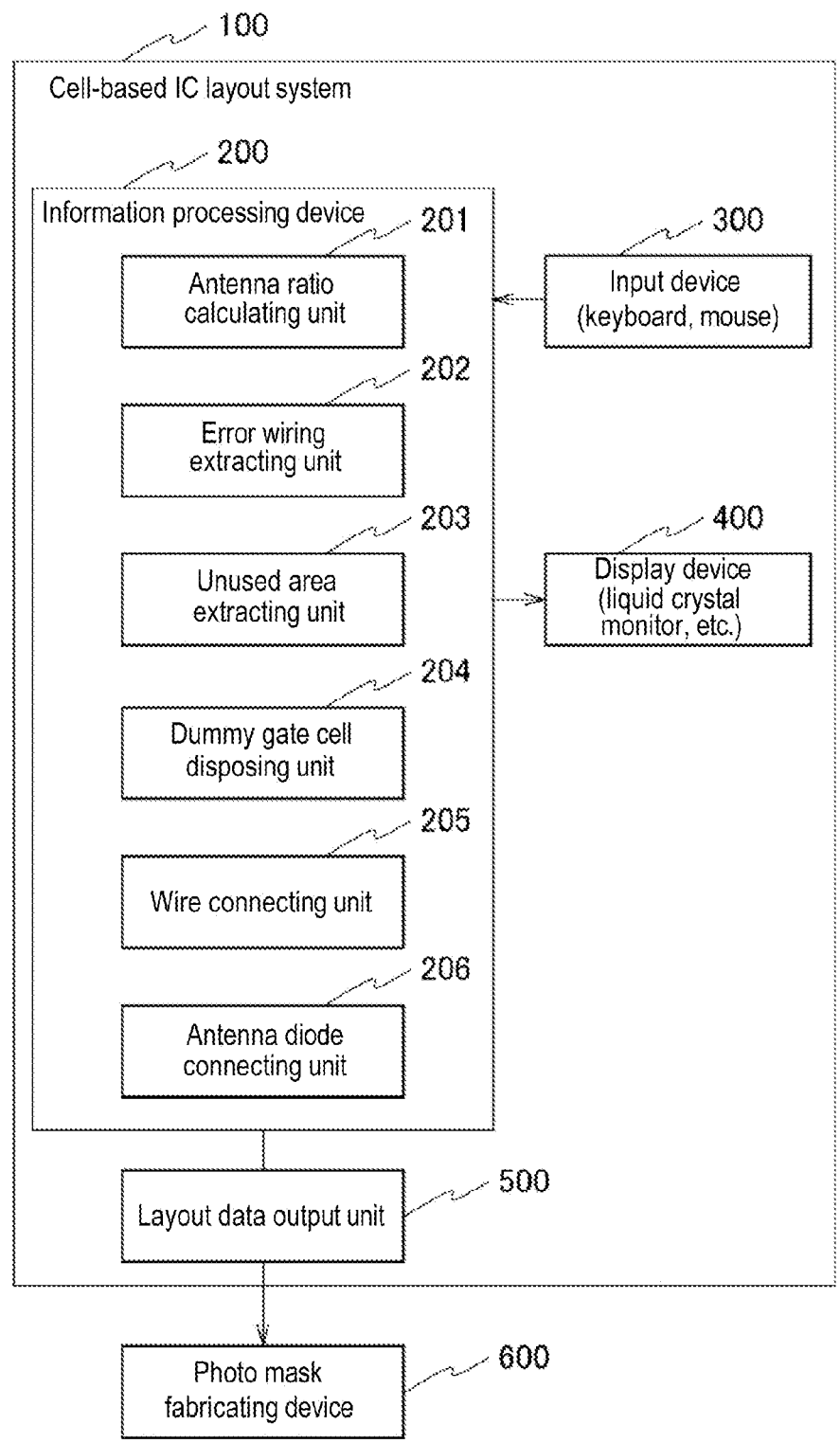
FIG. 2 is a functional block diagram illustrating a configuration example of a cell-based IC layout system according to an embodiment of the present disclosure.

Layout data (CAD data) layout-designed by the cell-based IC layout system 100 is output to the external photo mask fabricating device 600 through the layout data output unit 500 as illustrated in FIG. 2.

Then, a photo mask (not shown) is fabricated through the photo mask fabricating process in step S12 illustrated in FIG. 1.

Next, the cell-based IC 101 is completed on the semiconductor substrate fabricated in step S13 through the pre-process (wafer process) in step S14 and the post-process in step S15.

The completed cell-based IC 101 includes components layout-designed by the cell-based IC layout system 100.

That is, the cell-based IC 101 includes a semiconductor substrate, a plurality of basic cells 103 formed on the semiconductor substrate to have internal wirings and a plurality of semiconductor devices, and having a predetermined function provided by connecting the semiconductor devices using the internal wirings, a wiring region formed on the semiconductor substrate and having an external wiring for connecting the basic cells 103, a power source wiring 40a for supplying power to the semiconductor devices and a ground wiring 40b, and a dummy gate cell 1 formed on the semiconductor substrate and having an nMOS transistor 150 and a pMOS transistor 151, wherein a drain electrode 10 of the nMOS transistor 150 and a drain electrode 11 of the pMOS transistor 151 are not connected to each other, the dummy gate cell 1 is disposed in an unused area 150 not occupied by the basic cells 103, and a gate electrode 16 of the dummy gate cell 1 is connected to a wiring 50 between the basic cells 103 (see FIG. 6, etc.).

Accordingly, an antenna effect can be suppressed, while reducing a loss of wiring convenience and area usage efficiency.

Figure 18:
FIG. 18 is an illustration of a portable device in which the cell-based ICs may be installed, according to some embodiments of the present disclosure.

FIG. 18 is an illustration of a portable device to which the cell-based ICs may be applied according to some embodiments of the present disclosure. FIG. 18 is intended for illustrate an example portable device such as a smartphone, in which one or more cell-based ICs implemented according to the above embodiments may be installed at any suitable positions for being coupled to any other suitable components in the portable device. In general, the portable device described herein is indicative of various types of devices, such as a wireless phone, a cellular phone, a laptop computer, a wireless multimedia device, a wireless communication personal computer (PC) card, a PDA, an external or internal modem, a device that communicates through a wireless channel, and so on. A device may have various names, such as access terminal (AT), access unit, subscriber unit, mobile station, client device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

Other Embodiments

Although the present disclosure has been described through the foregoing embodiments, it should be appreciated that the description and drawings constituting part of this disclosure are merely illustrative, without limiting the present disclosure. Various substitute embodiments, examples, and operational techniques will become apparent to a person skilled in the art from this disclosure.

The embodiments as described above may have one or more of the following effects:

According to the present disclosure, it is possible to provide a dummy gate cell, a cell-based IC, and a layout system and a layout method of a cell-based IC capable of suppressing an antenna effect, while reducing a loss of wiring convenience and area usage efficiency.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A cell-based integrated circuit (IC), comprising:
   a semiconductor substrate;
   a plurality of basic cells formed on the semiconductor substrate to have a plurality of semiconductor devices and internal wirings, and having a predetermined function provided by connecting the semiconductor devices using the internal wirings;
   a wiring region formed on the semiconductor substrate and having an external wiring to connect the basic cells;
   a power source wiring configured to supply power to the semiconductor devices, and a ground wiring; and
   a dummy gate cell formed on the semiconductor substrate and having an nMOS transistor and a pMOS transistor, wherein a drain electrode of the nMOS transistor is not connected to a drain electrode of the pMOS transistor, the dummy gate cell is disposed in an unused area not occupied by the basic cells, and a gate electrode of the dummy gate cell is connected to the external wiring.

2. The cell-based IC of claim 1, wherein a source electrode of the pMOS transistor constituting the dummy gate cell is connected to the power source wiring, and a source electrode of the nMOS transistor is connected to the ground wiring.

3. The cell-based IC of claim 1, wherein the dummy gate cell comprises an antenna diode, a cathode electrode of the antenna diode is connected to the gate electrode of the dummy gate cell, and an anode electrode of the antenna diode is connected to the ground wiring.

4. The cell-based IC of claim 1, wherein a plurality of the dummy gate cells are disposed such that gate electrodes of the dummy gate cells are connected to each other.

5. A portable device comprising the cell-based IC of claim 1.

* * * * *